United States Patent Office 2,854,375
Patented Sept. 30, 1958

2,854,375
GERMICIDE
Leon F. Shackell, Morristown, N. J.

No Drawing. Original application May 17, 1944, Serial No. 536,054. Divided and this application September 15, 1949, Serial No. 115,955

2 Claims. (Cl. 167—31)

The present invention relates to a method of reducing, inhibiting or tempering the corrosive action of a caustic phenol on tissues of the vertebrates in particular, and to compositions thus obtained, wherein useful characteristics of such a phenol are retained, while its corrosive action is reduced or eliminated.

The present application consists of matters divided out of my copending application, Serial No. 536,054, filed May 17, 1944, now abandoned; said copending application disclosing nitrogenous and non-nitrogenous agents for use in reducing the corrosiveness of caustic phenols, but claiming only the use of nitrogenous agents for that purpose. In the present application the claims are limited to the use of non-nitrogenous agents for the same purpose. Accordingly, the present specification (exclusive of claims) is intended to be a substantially exact duplicate of the specification in said copending application, except for the omission herein, so far as seems practicable, of references to nitrogenous causticity-reducing agents that are disclosed in said copending application. Such omissions are indicated herein by triple asterisks (* * *).

The local corrosive action of a phenol is most marked in the monohydric phenols, at least those that are not substantially insoluble in water. Carbolic acid (monohydroxybenzene), o-chlorophenol, p-chlorophenol, 2,4-dichlorophenol, and the isomeric unsubstituted cresols (monohydroxytoluenes) are typical examples of highly caustic phenols. In my description and in my claims I intend that the terms "highly caustic phenol" and "caustic phenol" shall include only monohydric phenols which can exert substantially the same kind of local corrosive action on the intact skin, both in character and rapidity, such as is described for carbolic acid and tricresol in the second paragraph next below.

In order to prevent confusion, in the description hereinafter, between the generic term "phenol" and the specific compound, $C_6H_5OH$, the latter will be referred to by its common designation of carbolic acid. In addition to the caustic phenols that I have mentioned in the paragraph next above, I intend to include also in the generic term "caustic phenol" not only individual phenols of that class, whether pure, technically pure or crude, but also mixtures thereof, as well as commercial preparations containing the same, such as the so-called tar acids, cresylic acid, cresylic creosote, carbolic oil, wood creosote and other wood-tar and coal-tar distillates containing substantial proportions of one or more species of the caustic phenols.

The chief characteristics of the local corrosive action of a caustic phenol on the skin are well known. If, for example, a drop of tricresol or of liquefied carbolic acid, i. e., crystals thereof liquefied by admixture with about 10 percent of water, be brought in contact with the intact skin, a sharp burning sensation, arising from the area of application, ordinarily occurs almost instantly; but this is succeeded rapidly by loss of sensibility in the same area to touch, to pain and to thermal stimuli. At the same time the action of the phenol as a protein coagulant is manifested by whitening of the skin in the area. Unless at this point the phenol is washed off, preferably with ordinary (ethyl or grain) alcohol, the action of the phenol goes on to cause local necrosis to a variable depth in the skin. This so-called burn is slow to heal; not uncommonly leading to the formation of white scar tissue.

Although carbolic acid for many years has furnished a yardstick, namely, the phenol coefficient, for measuring the bacteriostatic and germicidal activities of a great variety of chemical agents, its caustic, corrosive and escharotic action upon the intact skin and upon other animal tissues has limited greatly its use in the local treatment of common infections and infestations of the skin of man and the lower animals, such as pimples, incipient boils, ringworm, mange, pediculosis and the like. The same disadvantage attaches generally to the other caustic phenols mentioned above.

Apparently as a direct result of the corrosiveness of such phenols, substantially all of the search for improved, phenol-type germicides and disinfectants has been directed to the synthesis of coal-tar derivatives possessing as high phenol coefficients and as low toxicities, systemic and local, as possible.

A principal object of my invention is to provide a method of reducing the corrosive action of a caustic phenol while at the same time avoiding a proportionate reduction in other characteristic activities of the phenol.

A correlative principal object of my invention is to provide a composition of matter, including a phenol and a causticity-reducing agent therefor, whereby the corrosive activity of the phenol is lowered to an extent that is disproportionately great in comparison to any reduction in other characteristic activities.

Another object of my invention is to provide a method of reducing the corrosiveness of a caustic phenol while avoiding any essential alteration in the molecular structure of the phenol.

Another object is to provide a composition of matter, including a physical mixture of a caustic phenol and a causticity-reducing agent therefor, whereby the causticity of the phenol is reduced without involvement of any substantial chemical interaction between the phenol and the causticity-reducing agent.

Another object is to provide a composition of matter, including a caustic phenol and a phenol-tempering agent which is adapted to inhibit the causticity of the phenol when present in the mixture in an equal or minor proportion, by weight, relative to the phenol.

Another object is to provide a substantially water-free composition of matter, including a caustic phenol and a tempering agent therefor, the composition being adapted for local application to the human skin, as well as to the skin of lower animals, whereby without injuring the skin to effect destruction of organisms responsible for various cutaneous disorders.

Another object is to provide a composition of matter, containing a caustic phenol and a causticity-reducing agent therefor, wherein the reduction in causticity of the phenol is disproportionately great in comparison with any reduction in the value of its phenol coefficient.

Another object is to provide, at lower cost than that of prior art phenolic preparations used for like purposes, a substantially water-free composition adapted for use as a germicide, a fungicide, a disinfectant or an insecticide, composing a physical mixture of a caustic phenol and a causticity-reducing agent therefor; the relative utilities of the several preparations being correlated with their respective causticities in computing their comparative costs.

Another object is to provide a substantially non-caustic composition containing a chemically unchanged caustic phenol in a concentration lying within a wide range of percentages; the composition still possessing useful characteristics of the untempered phenol.

Another object is to provide a composition of matter, containing a caustic phenol and a causticity-reducing agent therefor, wherein the reduction in causticity of the phenol is disproportionately great in relation to the degree of dilution of the phenol with the causticity-reducing agent.

Another object is to provide a substantially water-free, safely handleable liquid mixture of a caustic phenol and a causticity-reducing agent therefor, the mixture being adapted to effect sterilization of surgical instruments and like metallic objects immersed therein, but being free from any tendency to cause rusting or other metallic corrosion that may occur in the presence of water.

Other objects and uses of my invention will appear as the description thereof proceeds.

For perhaps fifty years a non-corrosive, liquid mixture of equal parts of carbolic acid crystals and gum camphor has been known under the name of camphor-phenol. In 1933 U. S. Patent No. 1,924,169 was granted to John E. Stacey for an antiseptic preparation comprising a mixture of camphor and one of the cresols.

That camphor-phenol has been, and still is, considered to be a unique system, is evidenced by the fact that as recently as September 1941, A. W. Francis reported the results of an extended physico-chemical study of camphor-phenol mixtures (Journal of American Pharmaceutical Association, vol. 30, pages 229 to 240). Francis refers therein to the Stacey patent. He concludes that his experimental data point to molecular association between camphor and phenol.

As far as I am aware, only two compounds, other than camphor—namely, glycerol and menthol—have been used to form antiseptic preparations with carbolic acid.

Glycerite phenol, one part liquefied carbolic acid mixed with four parts of glycerol, is a long-known preparation, listed formerly in the U. S. Pharmacopoeia and now in the National Formulary. The liquefied carbolic acid, however, contains 10 percent of water; so that glycerite phenol does not exemplify the substantially water-free composition contemplated as an embodiment of my invention.

I understand that menthol recently has been employed as a substitute for camphor in camphor-phenol.

For a period of some fifteen years prior to my discovery of the principle embodied in my novel method and compositions, I had employed camphor-phenol for aborting boils as well as for the treatment of other skin disorders. A marked disadvantage, however, of camphor-phenol is the great volatility and ready sublimation of the camphor at ordinary temperatures. The result is rapid evaporation of the camphor-phenol, necessitating repeated applications of the mixture to the part being treated.

In attempting to obviate this disadvantage of camphor-phenol, and yet to form a composition comprising a similar physical mixture of a caustic phenol with a causticity-reducing agent, so that the mixture still would exhibit high germicidal activity, I have discovered that a great many materials of wide variety, which are made up of polar molecules in a suitable state of polarization, i. e., molecules containing one or more polar radicals of certain types, possess the property of inhibiting the corrosive action of the caustic phenol on the skin. Consistent with this discovery I have found out also that so-called nonpolar, hydrocarbon molecules, as exemplified by benzene, p-xylene, cyclohexane, and pinene, exhibit no detectable causticity-reducing activity, other than any slight effect of that character attributable to dilution of the caustic phenol.

In extending my studies along this line I have tested many hundreds of compounds to determine broadly what types of substances will, and what will not, effect a suitable tempering of a caustic phenol without forming a reaction product therewith.

At this point it will suffice to say that I have found, in general, that polar compounds wherein the polar radicals are anionoid, electron-donating or nucleophilic in character, are particularly effective in reducing the corrosiveness of a caustic phenol. Later herein is a considerable list of such radicals. The term "polar radical," as used herein, comprehends not only a polar group comprising a plurality of atoms, but also a single atom, where the latter contributes to the state of polarization or polarizability of a polar material.

Polar compounds, on the other hand, wherein the polar radicals are solely or preponderantly cationoid, electron-accepting or electrophilic in character, exhibit little, if any, capacity to temper a caustic phenol. Typical examples of such cationoid radicals are halogeno and nitro. I have found, for instance, that the following cationoid compounds are unsuited for use as polar materials in the practice of my invention: Amylene dichloride; chlorobenzene; o-dichlorobenzene; nitrobenzene; 1-nitropropane; 2-nitropropane; s-tetrachlorethane; tetrachlorethylene.

I have found, however, that polar compounds, which contain both anionoid and cationoid radicals, may be effective causticity-reducing agents, provided, that their state of molecular polarization or polarizability is preponderantly anionoid in character. That a large enough number of unsaturated carbon atoms in a compound may suffice to overcome the effects of a cationoid radical is evidenced by the fact that o-nitrodiphenyl and 1-nitronaphthalene are fairly effective causticity-reducing agents, whereas nitrobenzene is not.

Unless otherwise indicated by the context, I intend my use herein of the term "polar material" to denote a compound (or mixture of compounds) the molecular structure whereof includes one or more anionoid polar radicals which impart to the compound (or mixture of compounds) the property of physically affecting the molecules of a caustic phenol in such a manner that the causticity of the phenol is reduced or inhibited; other characteristics of the phenol, however, remaining substantially unaffected. As I shall point out hereinafter, in discussing my theory of the mechanism involved, I ascribe the reduction in causticity to orientation polarization of the phenol molecules induced by the molecules of an effective polar material.

As subgeneric to the term "polar material" I shall use synonymously herein the terms "causticity-reducing agent," "phenol-tempering agent" and "phenol-polarizing agent." I preferably employ the last of these terms for a reason that will appear later herein.

The general characteristics that a polar material should possess in order to render it suitable for use in the practice of my invention are (a) that it shall be chemically compatible with one or more caustic phenols, i. e., that it shall undergo no substantial chemical reaction (in the conventional sense) with the caustic phenol, or phenols, at atmospheric pressure, at temperatures below 100° C., and in the absence of a condensing agent or other catalyst; (b) that it shall be capable of forming a substantially homogeneous physical system or mixture with an equal or greater weight of the caustic phenol, and (c) that its state of polarization shall be such as to enable it to reduce the causticity of the phenol below the causticity of the same phenol in a control mixture wherein the polar material is substituted by a substantially nonpolar liquid hydrocarbon functioning as a solvent or miscible diluent for the phenol.

Wherever in my claims I use the term "of the character described" with reference to a polar material or phenol-polarizing agent, I intend the term just quoted to comprehend characteristics (a), (b) and (c) as set forth in the next preceding paragraph.

Tests or criteria suitable for the determination of a reduction in causticity will be described hereinafter.

The substantially homogeneous physical systems, which I contemplate as embodying my invention, ordinarily will be liquids at or about room temperatures. Occasionally, however, I have formed operative embodiments of my invention which appear, respectively, as solids, as pastes, and as creams.

The character of a composition, embodying my invention, as a physical system or mixture, may be demonstrated by suitable tests known to the art; for example, by the ready separation from the composition of the more volatile ingredient thereof, whether it be the caustic phenol or the phenol-polarizing agent, either as the result of spontaneous evaporation or of distillation. For instance, a number of mixtures that I have prepared have begun to exhibit caustic effects only after spontaneous evaporation of a large part of the phenol-polarizing agent, which happened to be more volatile than the phenol. As examples thereof I may mention 1:1 mixtures of carbolic acid with each of the following compounds: Amyl borate, butyl alcohol, heptaldehyde, butyl acetate, ethyl carbonate, butyl ether, diethyl ketone and capronitrile.

Conversely, I have found that certain of my novel compositions, wherein the respective phenol-polarizing agents were substantially nonvolatile solids, could be left in contact with the skin, without eliciting any sign of caustic effect, until the caustic phenol had disappeared therefrom, leaving a finely granular residue of the polar material. As examples thereof I may mention * * * three liquid compositions consisting, respectively, of a major proportion of carbolic acid crystals, tricresol and o-chlorophenol, and a minor proportion of sulfonal, the latter in each instance forming a saturated mixture in equilibrium at room temperature with solid sulfonal.

I have found that the effectiveness of a given polar material in reducing the escharotic action of a caustic phenol, i. e., its tissue-necrosing or most corrosive type of action, may be tested accurately and with substantial rapidity on the human subject, while yet avoiding the danger of causing a phenol burn or any permanent disfigurement. The test may be either quantitative or qualitative or a combination of the two.

The quantitative test comprises a determination of the extent to which the polar material is able to delay the onset of initial or early caustic effect of the phenol, as exemplified by a burning sensation, or loss of sensibility to skin pain, or whitening of the skin.

The qualitative test involves observation of the degree to which any one or more of these early caustic effects is checked or inhibited, or even completely abolished. For example, a mixture of a caustic phenol and a particular polar material may induce some loss of sensibility to skin pain, and yet elicit no sensation of burning. Again, as I have indicated previously, I have made up many compositions embodying my invention, wherein the causticity of the phenol apparently had been inhibited completely, as evidenced by entire absence of any indicia of causticity during a test period which ended with the disappearance of the phenol from the test sample.

My preferred method of testing the efficacy of a given polar material as a causticity reducing or tempering agent involves primarily the measurement of sensibility to skin pain as affected by the composition, embodying my invention, which is being tested. Before I describe my preferred method of test, however, I shall discuss briefly the term "sensibility to skin pain."

In the technique of a neurologic examination it is a standard medical procedure to test for sensibility to skin pain by light exploratory pricks with the point of a needle or pin. In the case of a normal, intact skin a light pin prick, which is quite insufficient to puncture the skin, will elicit a fleeting subjective sensation of sharpness, or skin pain. Cessation of function in the sensory nerve supply to a patch of skin, as by mechanical injury, disease, or the action of a local anesthetic, results in the loss of sensibility to a pin prick; a condition for which the designation "analgesia" is more accurate than "anesthesia." All grades of diminution in pain sensibility, short of complete analgesia, may exist. Such a diminution commonly is termed "hypalgesia."

In testing the capacity of a given polar material to reduce the causticity of a phenol, I preferbaly employ the following method:

A drop of the mixture of phenol and polar material, or an equivalent amount if the mixture is in the form of a paste or solid, is brought in contact with the dry skin, say, of the forearm or of the anterior surface of the thigh, when disposed horizontally. The time is noted. Then the subject observes whether or not the mixture causes any sensation of burning. If a sensation of sharp burning occurs within one or two minutes, the test is terminated immediately; that is, the mixture is brushed or scraped off if solid, or is blotted with soft paper tissue, if liquid; and the affected area of skin is sponged off at least three times with alcohol. Rubbing alcohol is suitable.

Where a burning sensation rapidly follows upon the application of the mixture to the skin, its disappearance after washing off of the mixture ordinarily is succeeded by a transient erythema and hypalgesia.

If no burning is felt, nor whitening of the skin is observed, within the first two minutes of the test, then the subject (or an observer) pricks the skin lightly two or three times with the point of a needle or pin; passing the point through the mixture. If the pricks elicit no sensory response (analgesia), or if there is a definite blunting of sensation (advanced hypalgesia or incomplete analgesia), best determined by testing the adjacent, untreated skin in a similar manner, the test ordinarily is terminated in the manner above described.

If, however, the first pricking trials indicate no definite diminution of sensibility to skin pain, they are repeated at intervals of two or three minutes until either analgesia (or at least advanced hypalgesia) is demonstrable, or until the test has continued for 15 minutes without any perceptible diminution of pain sensibility. In either event the test is terminated in the manner described.

Where 15-minute trials have elicited negative results, I have carried out more rigorous tests with each of numerous compositions embodying my invention; each composition containing at least 50 percent of (originally) caustic phenol. I have permitted each such composition to remain in contact with the skin until disappearance of the phenol, either by volatilization or absorption, leaving behind in some instances a relatively nonvolatile residue of the phenol-polarizing agent. I already have given examples of the formation of such nonvolatile residues in connection with my previous discussion of the physical character of mixtures embodying my invention.

None of the more rigorous tests just referred to, some lasting for more than an hour, resulted in anything approaching a phenol burn; and in most instances the sole observable result was a transient erythema. It was very seldom, in fact, that one of my novel compositions, which failed to cause any burning sensation or even a detectable hypalgesia in a 15-minute test, did not elicit a perceptible erythema. Since, however, many compounds, both polar and nonpolar, the former including many phenol-polarizing agents, can elicit an erythema without exhibiting any corrosive, caustic or definitely irritant action on rather prolonged contact with the skin, I consider that an erythema, without more, resulting from a 15-minute causticity test of one of my novel compositions, does not warrant any conclusion other than that the composition so tested was devoid of caustic activity, at least for the period of test.

On the basis of many hundreds of tests that I have carried out, I consider that a polar material is adapted to reduce the corrosiveness of a caustic phenol if a substantially homogeneous physical system, consisting of one part of the polar material in admixture with one part or more of the phenol, when tested on the human skin in the manner described, either elicits no burning sensation or exhibits a delay in the time of onset of caustic effect, whether measured subjectively by a burning sensation, by hypalgesia or by analgesia, or objectively by whitening of the skin, in comparison with the time of onset of the caustic effect of a control mixture consisting of a like proportion of the same phenol and a substantially nonpolar liquid hydrocarbon adapted as a solvent or a miscible diluent therefor.

The hydrocarbon used in making up a control mixture should be capable of forming a homogeneous mixture with at least an equal weight of the caustic phenol. In general, the aliphatic hydrocarbons, because of their limited miscibility with the caustic phenols, are not suitable diluents for forming control mixtures. I have tested the following hydrocarbons, however, and have found them to be satisfactory in this respect: Cyclohexane; pinene; p-xylene; xylenes (mixed). The last was a technically pure grade of xylene, consisting of a mixture of the o-, m-, and p-isomers.

With all control mixtures that were tested the onset of caustic action was detected by a burning sensation. When this sensation became well defined or sharp, which occurred in a few seconds after it was first observed, the control mixture was washed away in the manner described above.

In Example 1 below are given representative results of tests with control mixtures, each made up of equal weights of the caustic phenol and the hydrocarbon solvent or diluent.

All quantities, parts, proportions or ratios of ingredients given herein are in terms of weight. Furthermore, having reference to the composition of one of my novel mixtures, and unless otherwise indicated, the first member of each numerical ratio stated herein, say 1:1 or 1:3, denotes the parts by weight of polar material, and the second member denotes the parts by weight of caustic phenol.

*Example 1.*—Control mixtures (1:1) of caustic phenols with substantially nonpolar hydrocarbons.

| Phenol | Hydrocarbon diluent | Onset of burning, seconds |
|---|---|---|
| Carbolic acid | Cyclohexane | 20 |
| Do | Pinene | 15 |
| Do | p-Xylene | 15 |
| Do | Xylenes (mixed) | 15 |
| Tricresol | Cyclohexane | 45 |
| Do | Pinene | 30 |
| Do | p-Xylene | 50 |
| Do | Xylenes (mixed) | 45 |
| p-Chlorophenol | Pinene | 45 |
| Do | Xylenes (mixed) | 40 |
| 2,4-Dichlorophenol | Pinene | 60 |
| Do | Xylenes (mixed) | 45 |

I ordinarily consider that a polar material meets characteristic (c), stated above, if, in a ratio to a caustic phenol of not higher than 1:1, it eliminates a burning sensation as a qualitative criterion of causticity, or if it delays the onset of caustic effect 100 percent or more beyond the time of onset thereof, as observed in the case of a control mixture, similar to those illustrated in Example 1, containing the same caustic phenol.

My preferred practice of the method which embodies my invention varies, depending upon whether the caustic phenol, as well as the selected causticity-reducing agent, is a solid or liquid at ordinary temperatures. The majority of such phenols, when substantially pure, occur as crystalline solids. The latter melt, however, at temperatures well below 100° C., and, for the most part, below 50° C. In the presence of small amounts of impurities—for example in the so-called practical or technical grades—the caustic phenols commonly exist as liquids. The latter also is true of some mixtures of isomeric phenols, as exemplified by commercial tricresol, which is a mixture of o-, m- and p-cresol.

In reducing the causticity of a phenol which is solid at room temperature I prefer to melt a known weight thereby by any suitable method which does not raise the temperature of any part of the phenol above about 95° C. A water-jacketed kettle which is not attacked by the phenol, nor by the causticity-reducing agent to be incorporated therewith, is convenient. The container should be provided with means for heating the water in the jacket and with suitable mechanism for stirring the contents of the kettle. To the molten phenol in the kettle is added a predetermined quantity of the selected causticity-reducing agent, irrespective whether the latter is in solid or in liquid form. If, upon stirring, the mixture does not readily form a homogeneous liquid, the temperature of the water in the jacket is raised to a point not substantially higher than is required to effect formation of a homogeneous liquid; and in no event higher than about 95° C. The resulting physical mixture may then be drawn off into bottles or other suitable containers provided with closures.

With the great majority of physical mixtures thus formed, the weight ratio of phenol to causticity-reducing agent is shown to have been kept within a suitable range, if, upon standing for a few days in a closed container at room temperature the mixture remains liquid and shows no separation of ingredients in solid form. If the causticity-reducing agent is naturally a liquid, and a crystalline phenol was employed in making the mixture any solid phase subsequently separating therein most probably will be an excess of phenol, which will call for a suitable additional weight of the causticity-reducing agent; for the separated phenol will exhibit substantially the same degree of causticity as untempered phenol.

If, on the other hand, the causticity-reducing agent originally was a solid, and some of the latter separates as a solid phase from its mixture with the phenol, then the liquid mixture may be separated from the polar material by decantation or filtration; or the excess of the phenol-polarizing agent may be liquefied by incorporating therewith a suitable proportion of the phenol, with the aid of a proper degree of heat, as previously described.

An alternative method of preparing compositions embodying my invention, when both the phenol and the polar material are solids at ordinary temperatures, is to grind together suitable quantities of the respective ingredients in a triturating device, such as a ball mill or colloid mill.

When the phenol and the polar material are liquids at ordinary temperatures, the forming of a physical mixture thereof may suitably be effected by stirring together, without the aid of heat, predetermined quantities of the respective ingredients.

In order to utilize the benefits attaching to the high concentrations of caustic phenols, which I preferably employ in my novel compositions, I ordinarily do not incorporate therewith any inert, or otherwise compatible, diluent. Nevertheless, where deemed desirable, I may dilute a composition embodying my invention with any suitable nonpolar or polar material. For example, I may dilute the composition with any suitable liquid hydrocarbon, or I may use as a diluent an additional quantity of the same polar material that I have employed as a phenol-polarizing agent in making up the composition. I may employ also as a diluent any one of numerous liquid cationoid compounds which alone are not suitable as phenol-polarizing agents; for example, halogenated hydrocarbons, * * *, phenyl ether, and the like.

Again, I may, if desired, make a cream, an unguent, a paste or a friable powder out of a liquid embodiment of my invention by suitable incorporation therewith of one or more compatible materials, known to the pharmaceutical art, such as an animal or vegetable fat, starch, talc, bentonite, kieselguhr, wood flour, and the like.

Many of the novel compositions embodying my invention contain preferably 50 percent or more of caustic phenol. Where, however, dilution of such a composition seems desirable for a particular use, the dilution may be integrated with the method of forming the composition, as follows: The caustic phenol and the selected phenol-polarizing agent, in suitably proportioned quantities, are dissolved, or incorporated, either separately or together, in a quantity of a compatible solvent, or miscible diluent sufficient to yield a final composition having the desired phenol concentration. This variant of my novel method may be employed to advantage when the caustic phenol and the phenol-polarizing agent are both solids at room temperature. The solvent, or miscible diluent, may be nonpolar or polar. In fact, if the selected phenol-polarizing agent is liquid at room temperature, it may, if desired, be employed in a dual capacity both as a causticity reducer and as a diluent.

In so far as the individual members of a particular class or generic group of polar materials possess characteristics (a), (b) and (c) that I have described hereinabove, I have found the following generic classes of compounds to be among those capable of accomplishing broadly the objects of my invention; including in particular a reduction in the corrosive action of a caustic phenol without a proportionate reduction in other characteristic activities of the phenol: Nonmenthane monohydric alcohols containing at least four carbon atoms; dihydric alcohols; aldehydes; * * *; esters; epoxy compounds; ethers; ketones which do not sublime at ordinary temperatures and at atmospheric pressure; * * *; organic acid anhydrides; organic acids containing at least one anionoid radical in addition to carbonyldioxy; and alkylphosphoric acids.

I have found, additionally, that derivatives or substitution products of the foregoing are capable of effecting a reduction in the corrosiveness of a caustic phenol without causing any substantial change in other characteristics thereof; and thus of accomplishing the general object of my invention—(a) when the substituent comprises an anionoid radical; (b) when the substituent comprises a cationoid radical, such as halogeno * * *, provided, that the state of polarization or polarizability of the derivative is preponderantly anionoid; and (c) when the substituent comprises sulfur. Compounds illustrative of the foregoing group (b) of preponderantly anionoid phenol-tempering agents occur in various examples given below, more particularly in Example 12. In my use of the term "sulfuretted polar material" I intend to include therein substances containing a mercapto, a sulfonyl, * * *, a thio, a thiocarbonyl, * * * or a thiophospho radical.

My use of certain generic designations in the second preceding paragraph, as well as in my claims, is intended to comprehend compounds which, unless specifically excepted, such as ethers containing the phenoxy radical, come within ordinary and usual chemical definitions of the respective classes, together with similar, related or analogous compounds, for example:

* * *

Esters include * * *; esters of mineral acids; esters containing one or more anionoid radicals other than, or in addition to, carbonyldioxy; * * *; and acylated carbohydrates.

Ethers include ether compounds containing one or more anionoid radicals, in addition to alkoxy; simple and mixed ethers devoid of the phenoxy radical; ethers containing a phenoxy group, together with at least one unsaturated, aliphatic carbon-to-carbon linkage.

Ketones include compounds that contain one or more anionoid radicals in addition to the characteristic carbonyl group.

In the subjoined list, along with their conventional chemical formulas or symbols, are examples of polar radicals, anionoid in character which are present in substances coming within one or another of the classes, genera or groups of polar materials set forth above, which I have found to be capable of accomplishing the general objects of my invention. In the subjoined list, as well as in Examples 2 to 15, inclusive, ordinary chemical symbols are used in the formulas for the polar radicals. In the formulas R denotes a hydrocarbon residue.

EFFECTIVE PHENOL-POLARIZING RADICALS

Acyl (RCO), * * *, acyloxy (RCOO), aldo (HCO), alkoxy (RO), * * *, boryl (BO), * * *, carbonyl (CO), carbonyldioxy (COO), * * *, diacyl (OCRCO), epoxy (—O—), furyl ($C_4H_3O$), hydroxyl (OH), * * *, keto (O:), mercapto (SH), * * *, oxalyl (OCCO), * * *, phospho ($PO_2$), silico ($SiO_2$), sulfonyl ($SO_2$), tetrahydrofuryl ($C_4H_7O$), * * *, thio (S), thiocarbonyl (CS), * * *, thiophospho ($PS_2$), * * *, unsaturated carbon.

One of the aforenamed phenol-polarizing radicals may be a component of a larger radical; for example, carbonyl is a component of acyl, of acyloxy, of aldo, of carbonyldioxy, and of other polar radicals. Nevertheless, for the purpose of this invention, each of the aforelisted effective phenol-polarizing radicals is to be considered in its entirety and as a different kind of radical from each of the others. A polar compound, which is an effective phenol-tempering agent, may contain unsaturated carbon in its molecular structure. Such unsaturated carbon is embraced within the general terms "polar radical" and "anionoid radical"; and, as indicated in Example 8 below, it may contribute somewhat to the phenol-tempering capacity of a compound which additionally contains another and different kind of polar radical. Standing alone in a hydrocarbon, however, as illustrated by pinene and the xylenes in Example 1 above, unsaturated carbon exerts an anionoid action which is insufficient to render the hydrocarbon suitable for use as a sole phenol-tempering agent in the practice of my invention. Consequently, I have employed one or more control mixtures of caustic phenols and substantially nonpolar hydrocarbons, similar to those illustrated in Example 1, as criteria for determining the phenol-tempering capacity of a polar material under test when formed into a substantially homogeneous physical mixture with a given caustic phenol, where the latter, and its proportion in the test mixture, were the same as in the control mixture or mixtures.

In Examples 2 to 15, inclusive, are set out illustrative results taken from many hundreds of skin reaction tests that I have made on as many different compositions comprising a caustic phenol and a phenol-polarizing agent. In order to present these data as concisely as possible I shall use code symbols as follows:

Representative caustic phenols that I have tested are carbolic acid (I), tricresol (II), o-chlorophenol (III), p-chlorophenol (IV) and 2,4-dichlorophenol (V). In the examples below the phenol (or phenols) tested with a stated polar material appears under its symbol in Roman numerals in parentheses following the name of the polar material. It will be observed that in many instances more than one species of caustic phenol was tested with the same phenol-polarizing agent. Unless indicated otherwise, the ratio of polar material to caustic phenol was 1:1; that is, the mixture, as originally made up, consisted of 50 percent of the phenol and 50 percent of the polar material. In certain instances, however—shown by the notation "sat."—some of the polar material separated from a liquid mixture which was in equilibrium therewith. In such a case the skin test was made with the liquid; the phenol, consequently, comprising a major fraction of the liquid.

For convenience of comparison, the various polar materials have been put into one or another of four categories—namely, A, B, C, and D—representing diminishing grades of effectiveness as phenol-polarizing agents. The mixtures classed in group A evidenced no caustic action on a fifteen minute contact with the skin. The mixture in group B elicited a moderate grade of caustic reaction, i. e., beginning burning or incomplete analgesia, in 11 to 15 minutes; those in group C a like grade of reaction in 6 to 10 minutes, and those in group D a similar reaction in 2 to 5 minutes.

In a few instances, as already has been pointed out, no caustic effect was observed until a major portion of the polar material had volatilized. Those cases are indicated by the notation "evap."

At the head of each of Examples 2 to 15, inclusive, there is a parenthetic note listing the polar radicals, to be found in one or another of the specific polar compounds tested, which have rendered the compounds suitable as phenol-tempering agents. Unless otherwise indicated, such polar radicals are anionoid in character. Those skilled in the calling will recognize which one or more of the polar radicals thus parenthesized is present in a given polar material.

*Example 2.*—Alcohols (monohydric) (polar radicals: Furyl, hydroxyl, tetrahydrofuryl, unsaturated carbon).

A. 2-(p-tert.-butylphenoxy) ethyl alcohol (I); cyclohexanol (I, II), lauryl alcohol (I, II); linalool (I, II); 2-methylpentanol (I); octyl alcohol (I); 2-phenylethanol (I); p-isopropylphenylethanol (V); terpineol (I, IV); tetrahydrofurfuryl alcohol (I, V); undecyl alcohol (I).

B. Cinnamic alcohol (I); myristyl alcohol (I).

C. Amyl alcohol (I-evap.); tert. butyl alcohol (I-evap.); 2,4-diamylcyclohexanol (I); heptyl alcohol (I-evap.); p-isopropylphenylethanol (I).

D. Benzyl alcohol (I); cetyl alcohol (I, III); 2,4-diamylcyclohexanol (IV); furfuryl alcohol (I).

Furfuryl alcohol and tetrahydrofurfuryl alcohol contain, respectively, furyl and tetrahydrofuryl as well as hydroxyl polar radicals.

*Example 3.*—Alcohols (dihydric) (polar radical: Hydroxyl).

A. Isobutylene glycol (I); decamethylene glycol (I-sat.; II-sat.; III-sat); ethylene glycol (I, II); pinacol (I); tetraethylene glycol (I).

B. Ethylene glycol (IV).

*Example 4.*—Aldehydes (polar radicals: Aldo, furyl, unsaturated carbon).

A. Aldol (I, II, V); anisaldehyde (I, II); cinnamaldehyde (I); d-citronellal (I); 2-ethyl-2-hexenal (I); furfural (I).

B. Cumaldehyde (I); 2-ethyl-2-hexenal (II-evap.).

C. Benzaldehyde (I); furfural (IV); hydrocinnamaldehyde (I); salicylaldehyde (II, III).

D. 2-ethylbutyraldehyde (I-evap.); 2-ethylhexaldehyde (I-evap.); heptaldehyde (I-evap.); salicylaldehyde (I).

Furfural contains both furyl and aldo polar radicals.

*Example 5.*—Amides—* * *.

*Example 6.*—Esters, including esters of mineral acids, * * *, esters containing one or more anionoid radicals other than carbonyldioxy, acylated carbohydrates, * * *. (Polar radicals: Acyl, alkoxy, * * *, boryl, * * *, carbonyl, carbonyldioxy, * * *, diacyl, furyl, hydroxyl, * * *, oxalyl, * * *, phospho, silico, sulfonyl, tetrahydrofuryl, unsaturated carbon).

Representative examples of polar materials which I have found to be suitable for the practice of my invention and which I term "esters," are set forth, together with the results of causticity-reduction tests, in subdivisions 6a, 6b, and 6c of the present example. In subdivision 6a are included examples of "esters" other than examples of acidulated amines and acidulated alcohol amines; the latter two groups being listed, respectively, under subdivisions 6b and 6c.

6a

A. Allyl caproate (I); * * *; amyl caproate (I); * * *; isoamyl carbonate (I-evap.); amyl laurate (V); amyl maleate (I); amyl oleate (III); amyl oxalate (V); benzoin acetate (I); benzoyl tartrate (I) benzyl acetate (I); benzyl benzoate (V); benzyl maleate (I); benzyl phthalate (III); benzyl succinate (I, III); bornyl acetate (I); butoxyethyl phthalate (I); butyl adipate (I, IV); butyl citrate (I); butyl crotonate (I-evap.); butyl furoate (I, II); butyl levulinate (I, II); butyl oxalate (I); butyl phosphate (I, V); butyl phthalate (I); butyl sebacate (I); butyl d-tartrate (I); cyclohexyl acetate (I); cyclohexyl adipate (I, II, V); cyclohexyl maleate (I, II, IV); cyclohexyl phthalate (III); * * *; diethylene glycol diacetate (I, V); diethylene glycol monolaurate (I); 2-ethoxy-2-ethoxyethyl acetate (I, III); 2-ethoxyethyl adipate (I); 2-ethoxyethyl carbonate (I); 2-ethoxyethyl glycolate (I); 2-ethoxyethyl sebacate (I); ethyl acetoacetate (I); ethyl acetylglycolate (I); ethyl benzoate (I); ethyl benzoyl acetate (I); ethyl o-benzoylbenzoate (I, II); * * *; ethylene diacetate (I); ethylene dibenzoate (I); s-ethyl ethanetetracarboxylate (I, II); ethyl heptylate (I); ethyl heptylmalonate (I); ethyl lactate (I); ethyl maleate (I); ethyl orthosilicate (I, II); * * *; ethyl undecylenate (V); beta-glucose pentaacetate (I, IV); glyceryl tribenzoate (I); glyceryl monoricinoleate (I); heptyl acetate (I-evap.); hexyl acetate (I-evap.); hexyl benzoate (I); linalyl acetate (V); mannitol hexaacetate (I); menthyl benzoate (I); methyl anisate (I); methyl benzoate (I); methyl cinnamate (I); methyl phenylacetate (I, II); methyl phthalate (I); methyl sebacate (I); monoacetin (I); 1-naphthyl acetate (I); 2-naphthyl acetate (I, IV); octadecyl acetate (III); sec. octyl acetate (I); phenylethyl acetate (I); phenyl phthalate (IV); pentaerythritol tetraacetate (I, III); sorbitol hexaacetate (I); sucrose octaacetate (I, II, V); tetrahydrofurfuryl acetate (I); tetrahydrofurfuryl adipate (I); triacetin (I, II); triheptylin (I); triphenyl phosphate (I, II); tri-iso-valerin (I).

B. Isoamyl acetate (I); amyl oxalate (I); p-tert. amyl phenylacetate (I); benzyl phthalate (I); butyl dl-malate (I); * * *; butyl phenylacetate (I); capryl adipate (I); o-cresyl acetate (IV); cyclohexyl phthalate (I); diethylene glycol dioleate (IV); 2-ethoxyethyl lactate (I); * * *; ethylene glycol dilaurate (I); * * *; ethyl undecylenate (I); furfuryl acetate (I); glyceryl tribenzoate (IV); heptyl heptylate (IV); linalyl acetate (I); * * *; phenyl benzoate (I, III); phenylethyl benzoate (I); phenylethyl cinnamate (I); phenyl phthalate (I).

C. Amyl borate (I-evap.); tri-p.-tert. amylphenyl phosphate (III); benzyl benzoate (I); butyl benzoate (I); butyl propionate (I-evap.); o-cresyl acetate (I); diethylene glycol dioleate (I); * * *; ethyl sulfate (I); glyceryl laurate (I); glyceryl monoricinoleate (V); glyceryl phthalate (I); hydroquinone diacetate (I); methyl abietate (I, IV); methyl salicylate (I); sec. octyl cinnamate (I); phenyl acetate (I); tribenzyl citrate (I); tri-o-cresyl phosphate (I, IV).

D. Allyl propionate (I-evap.); * * *; amyl laurate (I); amyl oleate (I); tri-p.-tert. amylphenyl phosphate (I); amyl stearate (I, IV); butyl acetate (I); isobutyl propionate (I-evap.); cellulose acetate (I); cetyl acetate (I); diethylene glycol distearate (I-salve); ethyl carbonate (I-evap.); ethyl sulfate (IV); glyceryl laurate (IV); glyceryl monostearate (I-paste); methyl myristate (I); methyl stearate (I); octadecyl acetate (I).

6b.—Acidulated amines

* * *

6c.—Acidulated alcoholamines

* * *

*Example 7.*—Epoxy compounds (polar radicals: Aldo, carbonyl, epoxy).

A. Cineole (I); dehydracetic acid (I-sat.; II-sat.); 1,4-dioxane (I).

B. 1,4-dioxane (III).

C. Paraldehyde (I).

*Example 8.*—Ethers (polar radicals: Alkoxy, hydroxyl, unsaturated carbon).

A. Amyl ether (I-evap.); diethylene glycol (I); diethylene glycol monomethyl ether (I); dipropylene glycol (I, V); ethylene glycol monobenzyl ether (I, II, III); tetraethylene glycol dimethyl ether (I, V).

B. Amyl ether (V-evap.); ethylene glycol monomethyl ether (I-evap.).

C. Butyl ether (I-evap.).

D. Ethyl orthopropionate (I-evap.).

An ether containing the phenoxy radical linked to an alkyl group, e. g., phenetole, is not an effective reducer of the corrosiveness of a caustic phenol. If, however, the phenoxy radical is attached to an aliphatic residue containing unsaturated carbon, as in anethole or isosafrole, the anionoid character of such unsaturated carbon apparently is sufficient to lend a definite phenol-polarizing activity to such an ether. This is shown in the following summary of tests with anethole and isosafrole:

A. Anethole (I, II, V).

B. Anethole (III); isosafrole (V).

C. Anethole (IV); isosafrole (III).

D. Isosafrole (I, IV).

*Example 9.*—Ketones (polar radicals: Acyl, carbonyl, furyl, hydroxyl, keto).

A. 2-acetonaphthone (I); acetonyl acetone (I); acetophenone (I, II, V); benzalacetone (I, V); benzalacetophenone (I, III); benzophenone (I, III); benzoyl acetone (IV); cyclohexanone (I, V); diacetone alcohol (I-evap.); di-iso-butyl ketone (I); difurfuralcyclohexanone (IV-sat.); di-p-tolyl ketone (I, II); fenchone (I, III); furfuralacetone (I, II, V); l-menthone (IV); mesityl oxide (I-evap.); methyl hexyl ketone (I); methyl p-tolyl ketone (I); phenyl amyl ketone (I); * * *; phenyl undecyl ketone (I, II, V); phorone (I, IV); 2-undecanone (I).

B. Benzil (IV); benzoyl acetone (I); dibenzyl ketone (I).

C. Benzil (I-sat.); difurfuralcyclopentanone (I-sat.; III-sat.); l-menthone (I-evap.); mesityl oxide (V); methyl isobutyl ketone (I-evap.).

D. Diethyl ketone (I-evap.); difurfuralcyclohexanone (I-paste); methyl 2-naphthyl ketone (III-solid).

*Example 10.*—Nitriles * * *.

*Example 11.*—Polar compounds containing an oxynitrogen linkage.

* * *

*Example 12.*—Polar compounds containing both anionoid and cationoid radicals. (Polar radicals—anionoid: acyl, * * *, carbonyl, carboinyldioxy, hydroxyl, sulfonyl, unsaturated carbon; cationoid: halogeno, * * *.)

A. * * *.

B. * * *; p-chloroacetophenone (IV); 2,4'-dichlorobenzophenone (V); methyl o-chlorobenzoate (III); * * *.

C. Benzyl chloroacetate (III); p-chloroacetophenone (I); 2,4'-dichlorobenzophenone (IV); 2-chloroethyl acetate (I, V); 2-chlorophenyl-4-toluene sulfonate (I, III); dichloro-tert. butyl alcohol, (I); dichorethyl ether (I); ethyl 1-chloroacetoacetate (I, IV); methyl o-chlorobenzoate (I); * * *.

D. Benzyl chloroacetate (I); 2-chlorophenyl-4-toluene sulfonate (IV); 2,4'-dichlorobenzophenone (I); dichloro-tert. butyl alcohol (IV); * * *.

*Example 13.*—Sulfuretted polar compounds (polar radicals: Mercapto, sulfonyl, * * *, thio, thiocarbonyl, * * *, thiophospho).

A. * * *; butyl sulfone (I, V); 2-dithiodiglycol (I-sat.); di-p-tolyl sulfone (III-sat.); * * *; sulfonal (I-sat.; II-sat.; III-sat.).

B. Diphenyl sulfone (I-sat.; IV); triphenyl thiophosphate (II).

C. * * *; di-p-tolyl sulfone (I-sat.); triphenyl thiophosphate (I).

D. Triphenyl thiophosphate (III).

*Example 14.*—Organic acid anhydrides (polar radicals: Acyl, acyloxy, carbonyl, carbonyldioxy, furyl, unsaturated carbon).

B. 2-furoic anhydride (I).

C. Benzoic anhydride (I); propionic anhydride (I).

D. Maleic anhydride (I-sat.); phthalic anhydride (I-sat.).

*Example 15.*—Acids (polar radicals: Acyl, carbonyl, hydroxyl, phospho).

B. Aleuritic acid (I, II).

C. Propylphosphoric acid (I).

D. Levulinic acid (I); methylphosphoric acid (I).

In the foregoing illustrative Examples 2 to 15, inclusive, each composition contained a polar material which either completely inhibited the corrosive action of a typically caustic phenol, or which delayed the onset of caustic effect for a period of time which was upwards of twice the time of onset of a like effect elicited by a control mixture of the same phenol in a substantially nonpolar hydrocarbon solvent or diluent of the type illustrated in Example 1.

Moreover, each of the polar materials set out in Examples 2 to 15, inclusive, possesses characteristics (a), (b) and (c) which, as already stated, are requisites of a phenol-polarizing agent suitable for use in the practice of my invention; each of said polar materials thus constituting a representative species of phenol-polarizing agent coming within one or another of the generic classes of polar materials defined by the respective captions that identify Examples 2 to 15, inclusive. As I already have stated hereinabove, all members of these generic classes of polar materials come within the scope of my invention in so far as any member thereof possesses characteristics (a), (b) and (c) and is not otherwise excluded by reason of any specific limitation that I may have set forth herein.

*Example 16.*—Test of mixtures of carbolic acid with two compatible polar materials belonging to different classes of compounds.

Thirty-six mixtures were made up, each containing 50 percent of carbolic acid; the remainder of each mixture, respectively, being divided equally between two different compounds selected seriatim from the following representative classes of polar materials: Acid amides, acidulated alcoholamines, aldehydes, anilides, esters, ethers, ketones, nitriles and sulfones. The specific representatives of these classes were, respectively: Acetamide; triethanolamine, 1.3 parts, neutralized to litmus with propionic acid, 0.7 part; aldol; acetoacetanilide; methyl phthalate; amyl ether; mesityl oxide; octadecanenitrile and sulfonal.

The 36 mixtures were made up so that in no two thereof was the combination of polar radicals the same. The polar radicals were: Acyl; acylamino; aldo; alkoxy; carbonyl; carbonyldioxy; carbonylimino; cyano; hydroxyl; nitrilo and sulfonyl.

None of the 36 mixtures, each, as aforesaid, containing 50 percent of carbolic acid, exhibited any caustic activity when tested on the skin for 15 minutes. That is, all of the mixtures were classifiable in group A, as that category has been employed in preceding examples.

In order to conform to the requisite characteristic (c) of a polar material for use in the practice of my invention, the minimal effective ratio of a suitable polar material to a caustic phenol may not be higher than 1:1. I have found many phenol-polarizing agents, however, each of which is adapted to temper two or more times its weight of a caustic phenol.

In the course of determining the minimal operative ratios of representative species of the more highly effective phenol-polarizing agents, more particularly those classed as A in Examples 2 to 13, inclusive, I have found that in many instances this minimal operative ratio, as determined by the skin reaction test above described, substantially coincides with that ratio which just suffices to prevent the segregation, within the mixture, of any appreciable proportion of the phenol as a separate phase. There are various tests known to the art for detecting such a segregation. Since the majority of caustic phenols, that come within the scope of my invention, crystallize, when pure, at temperatures higher than ordinary room temperatures, I have found it a time-saving and convenient procedure to determine, first, by trial, that ratio of a polar material to a caustic phenol which just suffices to prevent any crystallization of the phenol from its mixture with the polar material when the mixture either is allowed to stand for some time at room temperature in a closed container; or, preferably, is seeded with a crystal of the phenol. In effect, a mixture thus formed comprises a polar material which is substantially saturated with the phenol. The causticity-reducing capacity of the polar material in such a mixture I may then determine by the skin reaction test above described.

In Example 17 are set forth the results of skin reaction tests made on compositions embodying my invention; each consisting of a representative phenol-polarizing agent in admixture with two or more times its weight of crystalline carbolic acid, most of the compositions being substantially saturated therewith. Carbolic acid was chosen for this series of compositions because it is the most sharply corrosive of the caustic phenols.

In Example 17 the second member of each ratio denotes the number of parts of carbolic acid in admixture with unit part of each phenol-polarizing agent listed after a given ratio; while the percentage figures in parentheses denote the proportions of phenol-polarizing agents that are present. The parenthetic B, C or D following each listed polar material carries with it the same connotation that is attached to it in Examples 2 to 15, inclusive.

*Example 17*

1:9 (10%)—* * *.
1:5 (16.7%)—Acetonyl acetone (D); * * *; cyclohexanol (D); cyclohexanone (D); diethylene glycol (D); diethylene glycol monomethyl ether (D); 2-ethoxy-2-ethoxyethyl acetate (D); ethylene glycol (D); mesityl oxide (D).
1:4 (20%)—* * *; aldol (C); * * *; 2-ethyl-2-hexenal (D); methyl phthalate (D).
1:3 (25%)—* * *; amyl ether (D); octyl alcohol (D); terpineol (D); triacetin (D); * * *.
1:2.5 (28.6%)—Sulfonal (D).
1:2 (33.3%)—Butyl citrate (D); diethylene glycol monolaurate (D); * * *; sucrose octaacetate (C).

Having reference to the call in my claims for a mixture of a polar material and a caustic phenol, and more particularly for an amount of the polar material "sufficient to reduce the causticity" of the phenol, I intend the phrase just quoted to mean that the ratio of polar material to the caustic phenol shall be at or above the minimum that just suffices to effect a distinct reduction in the corrosiveness of the phenol, as evidenced by the results, either qualitative or quantitative or both, obtained in comparative skin reaction tests of the aforementioned mixture and of a homogeneous control mixture consisting of a like proportion of the same phenol and a substantially nonpolar hydrocarbon which is liquid at ordinary temperatures and is of the character illustrated in Example 1.

I have tested representative compositions embodying my invention, each composition containing at least 50 percent of a caustic phenol, ordinarily carbolic acid; and I have found such compositions to be highly effective as insecticidal sprays, as general disinfectants and as germicidal, fungicidal and insecticidal agents in such infections and infestations of the skin as pimples, incipient boils, ringworm, mange and pediculosis.

My conception of the mechanism of reduction in corrosiveness of a caustic phenol by a suitable polar material stems from the recent extension of electron theory into the field of organic chemistry. In stating my conception I desire to set forth what appears to me to be a rational scientific explanation of my broad discovery. I do not confine myself, however, to that explanation, nor do I intend thereby to limit in any manner or degree the scope of the invention herein described and claimed.

It now is recognized that a chemical reaction, in the conventional sense of the formation of one or more products differing in molecular structure from the reactants, involves the operation of valence forces leading to exchange of electrons and the formation of chemical bonds between electron-seeking and electron-donating centers or zones within the molecules of the respective reactants. The formation of distinct reaction products, however, may be conditioned upon one or more circumstances such as the special chemical characters of the reactants, the development of an adequate electron density at the sites of reaction in electron-donating molecules, and environmental factors such as favorable solvent media, auxiliary activating agencies such as heat and pressure, catalysts, et cetera.

There are, however, attraction forces, operative between unlike molecules, which are not as strong as the valence forces aforementioned—namely, intermolecular forces insufficient, per se, to lead to electron exchanges and the formation of reaction products, but sufficient to result in the formation of loose physical complexes. Thus, polar molecules of unlike species may orient each other in much the same manner as two freely movable small bar magnets when brought within their mutual spheres of influence. The result is the formation of loose physical complexes which do not obey the laws of combining proportions and of multiple proportions. In such orientation complexes unlike molecules are held together by electrostatic attraction between positive poles of one molecular species and negative poles of another. The degree of electroaffinity between the unlike molecules making up such physical complexes depends principally upon two independent variables—namely, (1) the states of polarization of the unlike molecules and (2) their respective polarizabilities.

The foregoing affords, I believe, the basis for a working theory of the mechanism of the tempering of a caustic phenol by a suitable polar material in the practice of my invention. I postulate the formation of physical complexes of caustic phenols and phenol-tempering agents through the mechanism of orientation polarization that I have just described. On this postulate is based my preferred use of the term "phenol-polarizing agent." Since, as is shown by the many examples that I have given, phenol-tempering capacity is a function of anionoid radicals, and since the phenyl group is electron-attracting in character, I assume that in an orientation complex of a caustic phenol and a phenol-polarizing agent, the phenyl radical or residue in the phenol and the anionoid portion of the phenol-polarizing molecule constitute the zones of electrostatic attraction and of closest proximity therebetween. According to my theory, then, the phenol in an orientation complex with a phenol-polarizing agent exhibits less affinity for water than does the same phenol when mixed in like proportion with a substantially nonpolar hydrocarbon solvent.

In order to explain the germicidal and fungicidal character of orientation complexes embodying my invention, I assume that such complexes break up or dissociate in contact with highly polar free or solvent water molecules leaving the phenol molecules in a state wherein they are conditioned for their typical toxic and disinfectant action by a favorable solvent medium, namely water. Incidentally, it is because water is one of the polar materials which, other than by any effect as a diluent, does not reduce the corrosiveness of a caustic phenol, that compositions embodying my invention preferably are substantially water-free. It has been known for many years that even dilute aqueous solutions of a caustic phenol, such as carbolic acid, are not devoid of corrosive effects on local application. For example, a 5 percent aqueous solution of carbolic acid, or even a more dilute solution, is irritant to the skin, and can cause necrosis or gangrene.

In a composition embodying my invention the apparently paradoxical combination of high germicidal and fungicidal activity toward microorganisms on or in the skin, with the absence of caustic effect upon the skin itself, may be explained in part by the relatively low content of unbound water in the outermost layer of the epidermis; whereas microorganisms which may be invading the skin have a high solvent water content characteristic of living protoplasm. A very important circumstance, moreover, is the great surface extension, relative to their individual masses, in microorganisms. Furthermore, my preferred compositions are those which comprise fifty percent or more of a caustic phenol; so that the concentration gradient of the phenol between such a composition and a group of microorganisms is very high, and the destruction of the latter correspondingly rapid.

Having reference to all of the examples set forth hereinabove, I desire it to be understood that they, as well as all specific compounds, substances, or materials, and all quantities, parts, proportions or ratios given therein, are intended to be illustrative only and in no sense limitative of my invention other than as the same is defined in the accompanying claims.

I claim:

1. A substantially water-free, phenolic, germicidal composition that is adapted as such for direct local application, said composition comprising a highly caustic monohydroxyphenol of the class consisting of carbolic acid, the isomeric cresols, o-chlorophenol, p-chlorophenol, and 2,4-dichlorophenol in substantially homogeneous physical admixture with a non-nitrogenous, oxygen-containing polar material whose molecular structure is rendered preponderantly anionoid in character by the presence therein of an effective number of electron-donating polar groups; said polar material being further characterized (a) by being chemically compatible with the caustic phenol, and (b) by being capable of forming a substantially homogeneous physical system with more than its weight of the caustic phenol; the polar material in said physical system, when said system, so formed, is applied to a substantially dry, cutaneous surface, causing the phenol therein to exhibit a delay in the time of onset of its caustic effect of at least 100 percent beyond the time of onset of caustic effect of a control mixture containing the same phenol in the same proportion by weight as in said physical system, but with said polar material being substituted in the control mixture by a substantially nonpolar hydrocarbon of the class consisting of cyclohexane, pinene, p-xylene and a mixture of isomeric xylenes; said polar material being a triglyceride of an aliphatic carboxylic acid, said acid containing not more than twelve carbon atoms; said composition containing the caustic phenol in an effective germicidal concentration; and said triglyceride being present in the composition in an amount sufficient to reduce the causticity of the phenol without proportionately reducing its germicidal power.

2. A substantially water-free, phenolic, germicidal composition that is adapted as such for direct local application, said composition comprising a highly caustic phenol in substantially homogeneous physical admixture with a non-nitrogenous, oxygen-containing polar material whose molecular structure is rendered preponderantly anionoid in character by the presence therein of an effective number of electron-donating polar groups; said polar material being further characterized (a) by being chemically compatible with the caustic phenol, and (b) by being capable of forming a substantially homogeneous physical system with more than its weight of the caustic phenol; the polar material in said physical system, when said system, so formed, is applied to a substantially dry, cutaneous surface, causing the phenol therein to exhibit a delay in the time of onset of its caustic effect of at least 100 percent beyond the time of onset of caustic effect of a control mixture containing the same phenol in the same proportion by weight as in said physical system, but with said polar material being substituted in the control mixture by a substantially nonpolar hydrocarbon of the class consisting of cyclohexane, pinene, p-xylene and a mixture of isomeric xylenes; said polar material being triacetin; said composition containing the caustic phenol in an effective germicidal concentration; and said triacetin being present in the composition in an amount sufficient to reduce the causticity of the phenol without proportionately reducing its germicidal power.

References Cited in the file of this patent

UNITED STATES PATENTS

| | | |
|---|---|---|
| 966,820 | Friedlander | Aug. 9, 1910 |
| 2,033,921 | Christiansen | Mar. 17, 1936 |
| 2,347,983 | Backoff | May 2, 1944 |

FOREIGN PATENTS

| | | |
|---|---|---|
| 8,429 | Great Britain | of 1893 |
| 757,556 | France | Dec. 28, 1933 |
| 849,280 | France | Nov. 17, 1939 |

OTHER REFERENCES

Brown: Quarterly J. of Pharmacy and Pharmacology, vol. 9, 1935, pp. 390–397.

Green: Bul. of the Nat. Formulary Comm., May–June 1943, pp. 91–95.

Marsden et al.: Chem. Abs., vol. 37, p. 2647 (Ab. of Trans. Faraday Soc., vol. 39, pp. 1–5, 1943).

Gilman: Organic Chem., An Advanced Treatise, vol. 2, 2nd ed., John Wiley and Sons, Inc., N. Y., 1943, pp. 1859–1860.

Martindale: The Extra Pharmacopoeia, 21st ed., vol. 1, London, The Pharmaceutical Press, 1936, pp. 744, 746, 747, 748.

Twort et al.: J. Hygiene, vol. 15, 1940, pp. 265, 303–306.